United States Patent
Kuo

(10) Patent No.: US 7,274,728 B1
(45) Date of Patent: *Sep. 25, 2007

(54) ADAPTIVE CHANNEL ESTIMATION USING CONTINUOUS PILOT SIGNAL BASED ON DOPPLER PERIOD

(75) Inventor: Wen-Yi Kuo, Marlboro Township, NJ (US)

(73) Assignee: Intel Corporation, Santa Clara, CA (US)

( * ) Notice: Subject to any disclaimer, the term of this patent is extended or adjusted under 35 U.S.C. 154(b) by 721 days.

This patent is subject to a terminal disclaimer.

(21) Appl. No.: 10/705,358

(22) Filed: Nov. 11, 2003

Related U.S. Application Data

(63) Continuation of application No. 09/861,041, filed on May 18, 2001, now Pat. No. 6,647,055, which is a continuation-in-part of application No. 09/652,936, filed on Aug. 31, 2000, now Pat. No. 6,507,604.

(60) Provisional application No. 60/266,025, filed on Feb. 2, 2001.

(51) Int. Cl.
 *H04B 1/69* (2006.01)
(52) U.S. Cl. .................. 375/148; 375/144; 375/346
(58) Field of Classification Search .............. 375/147, 375/148, 144, 346
See application file for complete search history.

(56) References Cited

U.S. PATENT DOCUMENTS

| | | | |
|---|---|---|---|
| 5,712,877 A | | 1/1998 | Ho et al. |
| 5,737,327 A | * | 4/1998 | Ling et al. ................ 370/335 |
| 6,493,329 B1 | * | 12/2002 | Leung ....................... 370/335 |
| 6,633,553 B1 | * | 10/2003 | Hwang ...................... 370/329 |
| 6,647,055 B2 | * | 11/2003 | Kuo ........................... 375/148 |
| 6,847,832 B2 | * | 1/2005 | Wong et al. ............. 455/562.1 |
| 2002/0015438 A1 | * | 2/2002 | Ishizu et al. .............. 375/147 |

\* cited by examiner

*Primary Examiner*—Temesghen Ghebretinsae
(74) *Attorney, Agent, or Firm*—Pearl Cohen Zedek Latzer LLP

(57) ABSTRACT

A method and apparatus to estimate the channel fade (both the amplitude gain/loss and the phase rotation) to assist the receiver to detect and recover the transmitted signal employs a continuous pilot signal such as the pilot code channel or pilot symbols. The channel estimator uses the same scrambling pattern of pilot channel and coherently integrates the continuous pilot signal to yield a channel estimate. The present invention employs adaptive integration duration to yield a channel estimate. The integration duration of the pilot signal for channel estimation is adaptive and proportional to the Doppler period. The Doppler period is proportional to the inverse of Doppler frequency and is an indicator of how fast the channel changes.

6 Claims, 5 Drawing Sheets

ADAPTIVE CHANNEL ESTIMATION USING CONTINUOUS PILOT SIGNAL BASED ON DOPPLER PERIOD

CROSS REFERENCES TO RELATED APPLICATIONS

This application claims the benefit of U.S. Provisional Application Ser. No. 60/266,025 filed on Feb. 2, 2001 and is a continuation of application Ser. No. 09/861,041 issued U.S. Pat. No. 6,647,055 filed on May 18, 2001 which is a Continuation-In-Part of application Ser. No. 09/652/936 issued U.S. Pat. No. 6,507,604 filed on Aug. 31, 2000.

FIELD OF THE INVENTION

This invention relates to the field of wireless digital communications, and more particularly to receiver channel estimation for such signals.

BACKGROUND OF THE INVENTION

Wireless communications facilitates the delivery of information between the transmitter and the receiver without a physical wired connection. Such advantage translates to the freedom of mobility for the users and to the savings of wiring nuisance for the users. However, spectrum has become scarce resource as the usage of wireless communications for various applications becomes more popular. Therefore the efficiency of using spectrum presents challenges for the wireless industry. In order to maximize efficient spectrum utilization, various multiple access methods have been proposed to achieve the goal.

First generation cellular communications systems, Advanced Mobile Phone Services (AMPS) employed the Frequency Division Multiple Access (FDMA) method and provided voice communication services in the early days. Second generation cellular communications systems improved the spectrum efficiency by using more digital processing of signals and employed Time Division Multiple Access (TDMA) method in GSM and IS-136 systems and Code Division Multiple Access (CDMA) method in IS-95 systems. While second generation systems typically provide two to five times voice capacity over the first generation systems, data capabilities of second-generation systems are very limited.

Recent rapid commercial development of Internet and multimedia applications has created a strong demand for wireless cellular systems capable of providing sufficient bandwidth. In addition, further improvement of voice capacity in spectrum efficiency is in great demand as the spectrum allocated for service is very limited. This scarcity results in high licensing fees for the available spectrum.

Therefore there is a strong need to improve the system capacity and spectrum efficiency for wireless communication systems.

SUMMARY OF THE INVENTION

The present invention is a method and apparatus for adaptive channel estimation using continuous pilot signal based on Doppler period. This provides an estimate of the channel fade (both the amplitude gain/loss and the phase rotation) to assist the receiver to detect and recover the transmitted signal.

BRIEF DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

The present invention is a method and apparatus to estimate the channel fade (both the amplitude gain/loss and the phase rotation) to assist the receiver to detect and recover the transmitted signal. The method and apparatus employs a continuous pilot signal such as the pilot code channel or pilot symbols. The channel estimator uses the same scrambling pattern of pilot channel and coherently integrates the continuous pilot signal to yield a channel estimate. The present invention employs adaptive integration duration to yield a channel estimate. The integration duration of the pilot signal for channel estimation is adaptive and proportional to the Doppler period. The Doppler period is proportional to the inverse of Doppler frequency and is an indicator of how fast the channel changes.

In wireless communications, radio waves from a transmitter arrive at a receiver via several paths (multipaths) having different path lengths. The receiver combines the radio waves. However, the combining of the radio waves is not performed by coherent addition, as a result of which fading occurs. Various diversity schemes have been proposed to deal with such fading. One example is a rake receiver scheme. Rake reception is a technique, which involves identifying signals that have passed through multipaths and combining the signals (by maximum-ratio combining) upon weighting them for reliability, thereby improving the characteristic.

Digital cellular wireless communication systems using CDMA technology have been developed as next-generation mobile communications systems for implementing wireless Internet and multimedia communication. In such CDMA communication systems, transmission information from a plurality of channels or users is multiplexed by spreading codes that differ from one another and is transmitted via a transmission path such as a wireless link.

CDMA system concepts have been incorporated into the dominant third generation (3G) standards. As the whole wireless industry moves toward 3G development and deployment, CDMA systems are becoming increasingly more popular. Due to the ability to resolve multiple paths, CDMA systems usually employ a rake receiver in the signal reception process. This invention proposes a new scheme that improves the rake receiver design for CDMA systems.

Figure 1A:
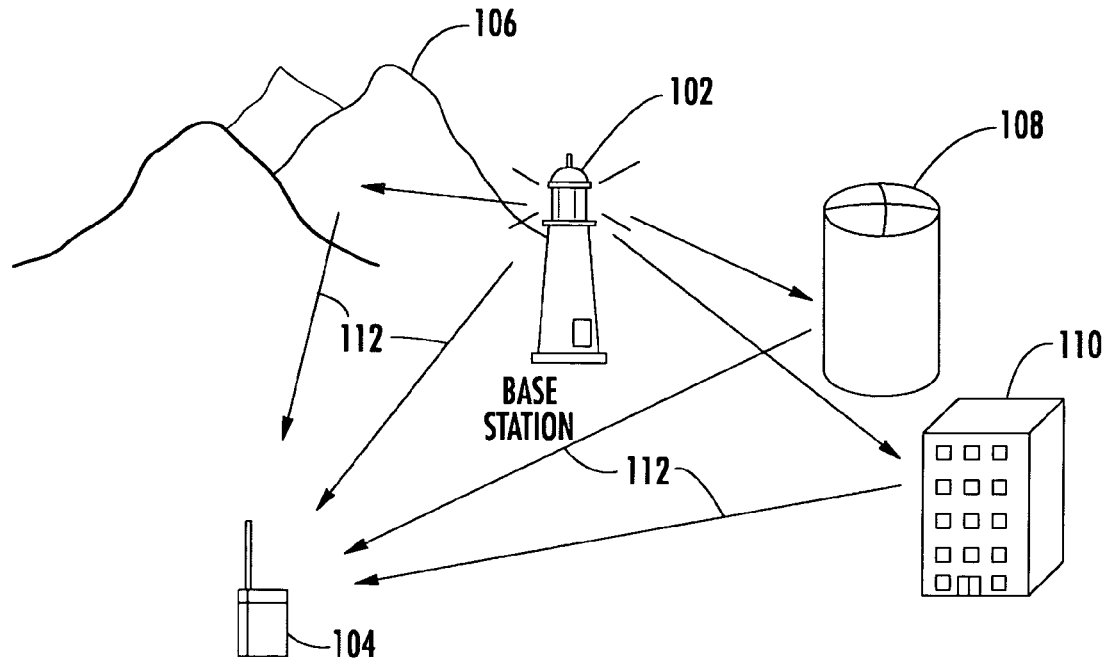
FIG. 1a is a stylized representation of a typical multipath channel model.
Figure 1B:
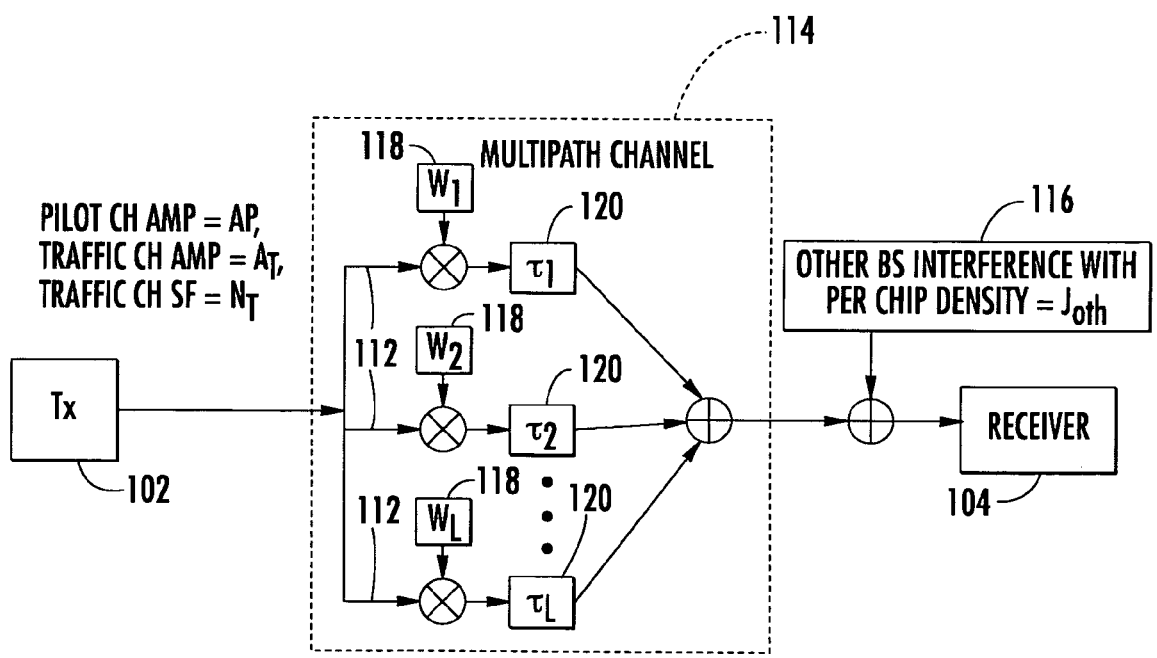
FIG. 1b is a block diagram representation of a typical multipath channel model.

One major advantage of CDMA systems is their efficient usage of wide bandwidth signal. CDMA systems transmit wide bandwidth signal over the air from the transmitter to the receiver. Referring to FIG. 1a there is shown a stylized representation of a typical multipath channel model. A base station 102 transmits a signal to a mobile station 104. A variety of reflecting objects, such as geographical features (mountains, etc.) 106, storage towers (water, gas, oil, etc.) 108, and buildings 110 as well as other objects cause the signal will be split into multiple paths and arrives at the receiver with different delay. Typically, each transmission path 112 has different length and different reflection condition and thus yields different delay and different channel attenuation in both the signal amplitude and phase rotation. Referring to FIG. 1b there is shown a block diagram representation of a typical multipath channel model. The transmitted signal follows a multipath channel 114, which is comprised of various transmission paths 112. Other base station interference 116 combines with the multipath channel signal and is received by the mobile station 104. Each transmission path gives the signal a different complex gain ($w_1$) 118 (signal strength) and a different corresponding delay 120 ($\tau_1, \tau_2 \ldots \tau_1 \ldots \tau_L$).

The wide bandwidth that CDMA signal transmits helps resolve transmission path ambiguity and materializes the detection of signal at different paths. CDMA systems, such as the mobile receiver 104, therefore, incorporate a rake receiver to combine the signals from different paths. The rake receiver is usually equipped with several fingers with each finger demodulating and decoding the signal at a path with different delay. The rake receiver uses a soft combination of signals from different fingers to "rake" the received signal and reconstruct the transmitted signal. The "soft" combination at a rake receiver presents the intrinsic diversity gain spread over different paths. The rake receiver is thus one of the most critical subsystems in CDMA communication systems.

Figure 2:
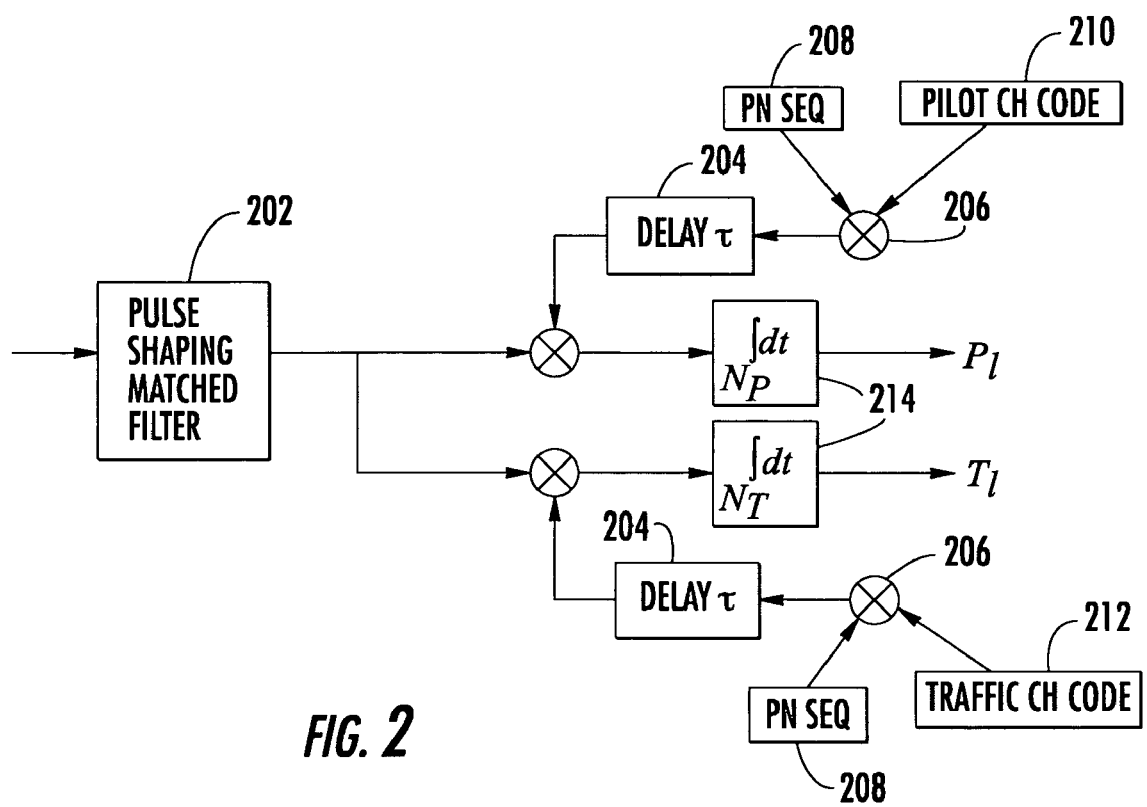
FIG. 2 is a block diagram of the rake receiver processing at each finger.

For mobile communication systems, channel fading can rapidly change, therefore the usual practice for CDMA systems is to utilize pilot signals (i.e., known signal or training sequence either in the form of pilot code channel(s) or pilot symbols) transmitted together with the traffic signals. The rake receiver detects the pilot signal and provides the channel estimate at each finger. Referring to FIG. 2 there is shown a block diagram of the rake receiver processing at each finger. The received signal after the matched filter 202 (matched to the transmitted pulse shaping), is then de-spread with a hypothesized delay τ 204. A typical de-spread operation is a multiplication 206 with the product of the PN sequence 208 (which is associated with the transmit base station and the user) and the specific channel orthogonal code (i.e., code for pilot code channel 210 or traffic code channel 212), then followed by an integration 214 over certain period. The hypothesized delay τ is unique to each finger so that multiple fingers are set up to capture the signal at multiple paths. The integration period for traffic channel is the symbol duration in the traffic channel. The integration duration for pilot channel depends on the channel variation speed or the vehicular speed and is the major issue to be talked in this invention.

The result of the integration at the $l^{th}$ finger is a pilot signal $P_l$ and a traffic signal $T_l$.

The PN sequence is the pseudo random sequence. The sequence can be generated by a shift register with some binary add operations so the output sequence appears random. However, as long as the receiver knows the seed for the register and timing, it can re-generate the sequence. By correlating the received sequence with re-generated sequence, only the desired signal will have a large gain (called spreading gain) and suppress the interference.

The prior art of soft combining at rake receiver is to simply weight the signals from different paths by the associated finger's conjugate of channel estimate. A conjugate is to de-rotate the phase while reserving the amplitude. Denote the complex output (with I+jQ format where I is the in-phase component and Q is the quadrature phase component) of the de-spreader at the $l^{th}$ path for the traffic channel and pilot channel, as $T_l$ and $P_l$, respectively. Thus, prior art of soft combining at rake receiver performs the following operation $$D = \sum_{l=1}^{L} \mathrm{Re}[T_l P_l^*] \qquad \text{Eq. 1}$$

or $$D = \sum_{l=1}^{L} \frac{\mathrm{Re}[T_l P_l^*]}{V_l} \qquad \text{Eq. 2}$$

where L is the total number of paths, D is the decision variable with D>0 in favor of +1 transmitted and D<0 in favor of −1 transmitted, * denotes the conjugate operation, Re[x] is an operation taking the real part of x, $$V_l = E\lfloor |T_l - E[T_l]|^2 \rfloor \text{ or } V_l = E\lfloor |P_l - E[P_l]|^2 \rfloor \qquad \text{Eq. 3}$$

E is the expectation operation which will take the mean out of the random variable inside.

Figure 3:
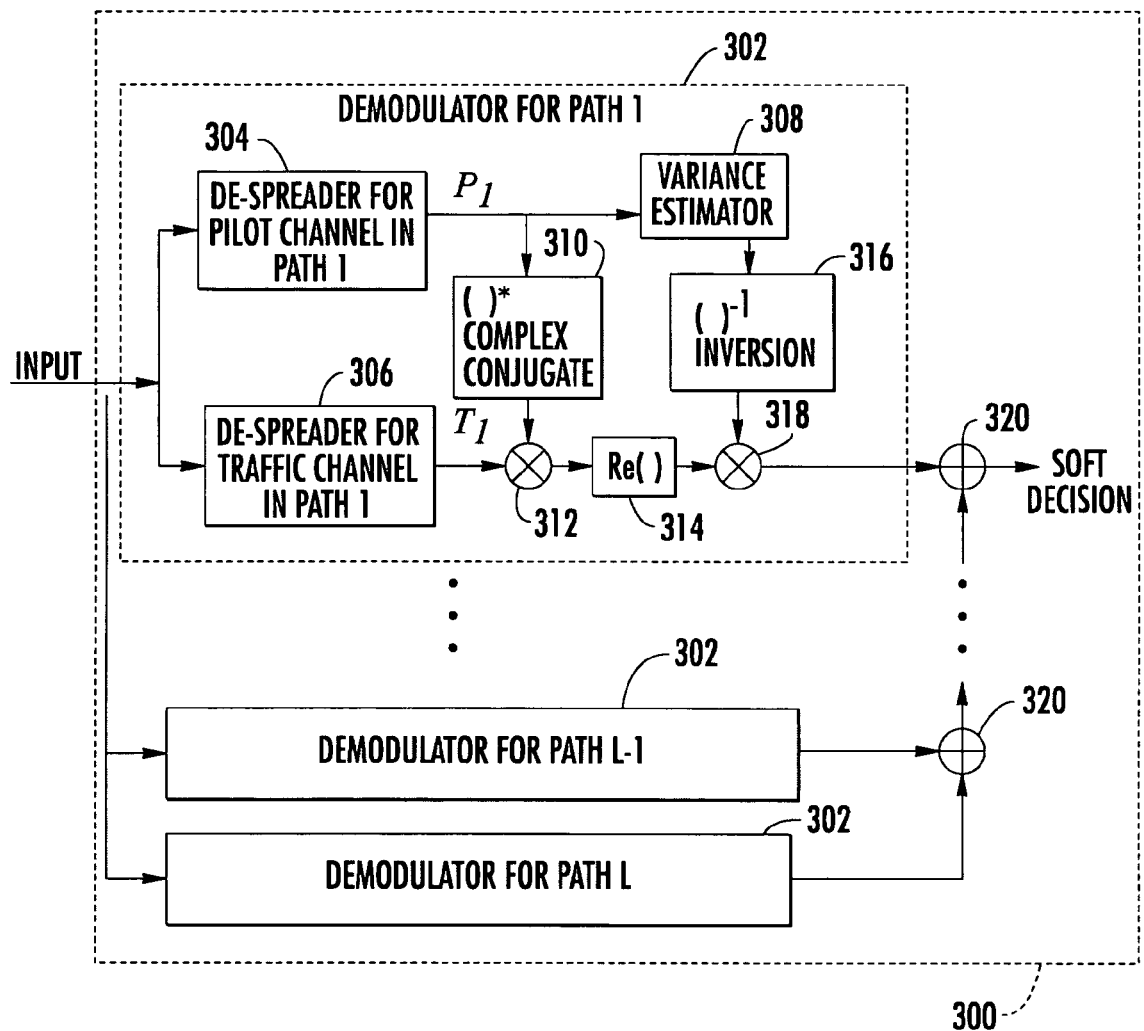
FIG. 3 is a block diagram representation of the resultant rake receiver.

Referring to FIG. 3 there is shown a block diagram representation of the resultant rake receiver. The pilot channel can be the pilot code channel or the pilot symbols. The architecture of the present invention is equally well suited for application to a rake receiver of any CDMA systems. The received signal is processed by a signal processor 300 having a corresponding demodulator 302 for each transmission path 1 through L. The demodulator 302 for path 1 contains a de-spreader for the pilot channel 304 in path l and a de-spreader for the traffic channel 306 in the path l. A variance estimator 308 and a complex conjugate function 310 are coupled to the output of the de-spreader for the pilot channel 304. The output of the de-spreader for the traffic channel 306 and the output of the complex conjugate function 310 are input to multiplier 312. Function Re[x] 314, which is an operation taking the real part of x, is coupled to the output of multiplier 312. An inversion function 316 is coupled to the output of variance estimator 308. The output of the inversion function 316 and the output of function Re[x] are coupled to the inputs of multiplier 318. The output of multiplier 318 is coupled to adder 320. Corresponding adders 320 combine the corresponding outputs of the demodulators for paths 1 through L.

In the process of receiver operation, one critical process is to integrate the pilot signal and obtain a good channel estimate. Since the wireless mobile channel is so dynamic, the pilot integration duration is thus in a dilemma to determine. Intuitively, one should use long integration duration so enough pilot signal to interference ratio can be achieved for channel estimate. On the other hand, if the channel is rapidly changing (i.e., the mobile station, MS, is moving), using pilot signal that is distant in time (thus uncorrelated) from the desired estimate time point will lead to larger estimation error. Therefore, the integration duration cannot be too long. From such reasoning, there exists an optimal integration duration to achieve best channel fade estimate. In this invention, a methodology is derived to adaptively adjust the pilot integration duration.

Figure 4:
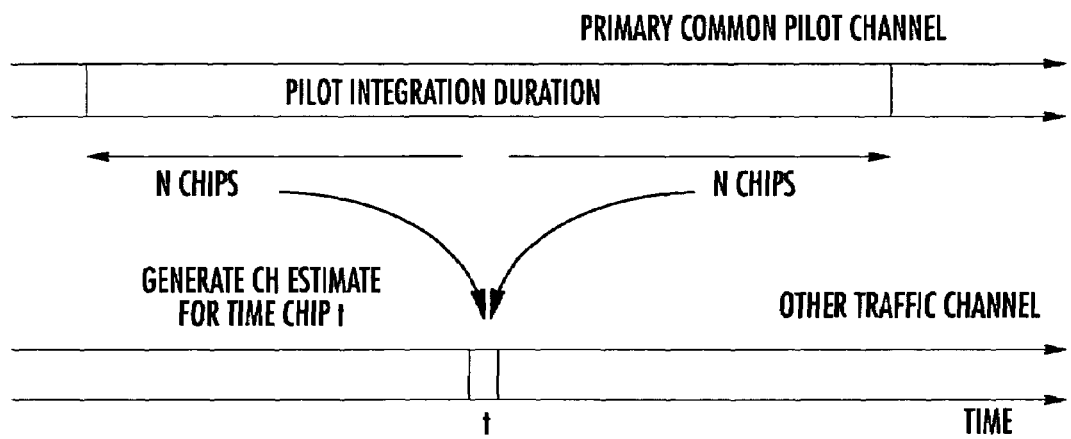
FIG. 4 is a diagram of timing relationship for symmetric pilot integration window.
Figure 5:
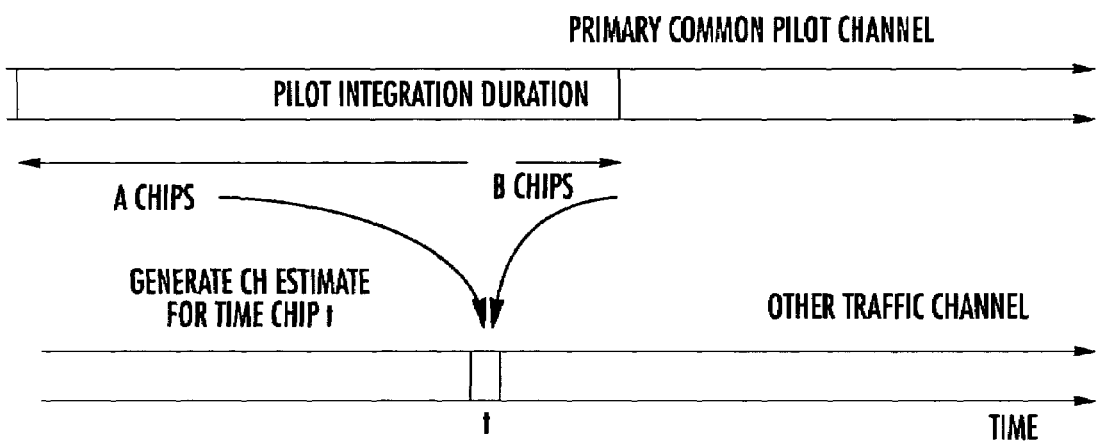
FIG. 5 is a diagram of timing relationship for asymmetric pilot integration window.

FIG. 4 shows a diagram of timing relationship for symmetric pilot integration window. FIG. 5 shows a diagram of timing relationship for asymmetric pilot integration window. Using symmetric window yields better performance than asymmetric window and therefore is usually employed. However, in some scenarios, the processing of data/message is limited by the delay tolerance and therefore asymmetric window has to be used. For instance, for the carried load processing (i.e., the data bits in the traffic channels such as DPCH, BCH, FACH, DSCH, etc. in WCDMA), it usually allows enough delay so symmetric window can be used. However, the DL TPC bits in WCDMA, may only allow very small value of B or even zero due to fast action required.

The present invention considers both cases of implementations for channel estimate and derive the analytical model to yield the rules on selecting integration period to achieve optimal or close to optimal performance. Various channel conditions are considered including Rayleigh and Rician channel as well as various other cell interference conditions in the downlink.

The analytic model is developed as follows:

Without loss of generality, the per chip samples of pilot code channel matched filter output can be modeled as:

$$z_t = x_t + y_t \qquad \text{Eq. 4}$$

where $z_t$ is the pilot code channel matched filter output at chip time t, the transmitted signal at pilot code channel is assumed to be all one (although pilot code channel usually has scrambling code operation in it, the receiver and the transmitter will have exactly the same code pattern and therefore equivalently, the scrambling has no effect in the signal analysis), $x_t$ is the complex-valued Jakes-model channel fade (i.e., multiplicative distortion, MD) at chip time t and has the following properties:

$$E[x_t] = \sqrt{\frac{KE_x}{K+1}} \text{ and } E[x_t x_s^*] = E_x \frac{K + J_0(2\pi f_D(t-s)T_c)}{K+1} \qquad \text{Eq. 5}$$

K is the Rician parameter (where K=0 meaning Rayleigh fading), $E_x$ is the average power of the channel fade, $y_t$ is the zero-mean complex-Gaussian interference (Because of orthogonal modulation, other code channels' signal in the same path yield trivial interference to the desired pilot signal. For single path, the interference is due to other cells' transmission. For multiple paths, the interference to a path includes the interference from other cells' transmission and the interference from other paths.) to the pilot code channel at chip time t and has the following properties:

$$E[y_t] = 0 \text{ and } E[y_t y_s^*] = E_y \delta(t-s).$$

The channel estimate for time chip t using asymmetric pilot integration window as in FIG. 5 is thus $$\hat{x}_t = \frac{1}{A+B+1} \sum_{n=t-A}^{t+B} z_n = \frac{1}{A+B+1} \sum_{n=t-A}^{t+B} x_n + w_t \qquad \text{Eq. 6}$$

and $$w_t = \frac{1}{A+B+1} \sum_{n=t-A}^{t+B} y_n \text{ with } E[w_t] = \qquad \text{Eq. 7}$$

$$0 \text{ and } E[w_t w_s^*] = \frac{E_y}{A+B+1} \delta(t-s)$$

Note that symmetric window (as shown in FIG. 4) is only a special case of the generic asymmetric model by using A=B. Therefore the formula derived for asymmetric model can also be applied to the case for symmetric window.

The channel estimation variance at time t is thus $$E[|\hat{x}_t - x_t|^2] = E\left[\left(\frac{1}{A+B+1} \sum_{n=t-A}^{t+B} x_n - x_t + w_t\right) \right. \qquad \text{Eq. 8}$$

$$\left. \left(\frac{1}{A+B+1} \sum_{n=t-A}^{t+B} x_m^* - x_t^* + w_t^*\right)\right]$$

$$= \left(\frac{1}{A+B+1}\right)^2 \sum_{n=t-A}^{t+B} \sum_{m=t-A}^{t+B} E[x_n x_m^*] -$$

$$\frac{1}{A+B+1} \sum_{n=t-A}^{t+B} 2\text{Re}(E[x_n x_t^*]) + E[|x_t|^2] + E[|w_t|^2]$$

$$= \left(\frac{1}{A+B+1}\right)^2 \sum_{l=0}^{A+B} M(l) E_x \frac{K + J_0(l 2\pi f_D T_c)}{K+1} -$$

$$\frac{2}{A+B+1} \sum_{n=-A}^{B} E_x \frac{K + J_0(l 2\pi f_D T_c)}{K+1} + E_x + \frac{E_y}{A+B+1}$$

where $$M(l) = \begin{cases} A+B+1 & \text{for } l=0 \\ 2(A+B+1-l) & \text{for } l>0 \end{cases} \qquad \text{Eq. 9}$$

The performance of channel estimate can be further normalized to the pilot channel power (or path gain) and is thus $$\frac{E[|\hat{x}_t - x_t|^2]}{E[|x_t|^2]} = \left(\frac{1}{A+B+1}\right)^2 \sum_{l=0}^{A+B} M(l) \frac{K + J_0(l 2\pi f_D T_c)}{K+1} - \qquad \text{Eq. 10}$$

$$\frac{2}{A+B+1} \sum_{n=-A}^{B} \frac{K + J_0(n 2\pi f_D T_c)}{K+1} + 1 + \frac{\left(\frac{E_y}{E_x}\right)}{A+B+1}$$

where Ey/Ex is the pilot channel interference density and can be determined by (for single path)

$$\frac{E_x}{E_y} = \text{pilot} - \text{to} - \text{interference ratio} \qquad \text{Eq. 11}$$

$$= \frac{\text{pilot power}}{BTS \text{ total transmit power}} \cdot \frac{\text{received power from serving } BTS}{\text{other received power}}$$

$$= \text{pilot\_ratio} \cdot \frac{I_{or}}{I_{oc}}$$

Note that the term Ioc/Ior is the downlink other cell interference density and is usually associated with the mobile's location. For instance, for mobiles located close to the serving cell site, Ioc/Ior will be of very small value. If the mobile is further away from the serving cell site (such as in the handoff zone), Ioc/Ior is of larger value. Notice that for multi-path channels, the interference will then include the power from other paths and is equivalently encountering higher Ioc/Ior.

From Equation 10, it is known that the optimal pilot integration window (i.e., A & B) depends heavily on the value of $f_D T_c$. Defining Doppler period as $$\text{Doppler Period} = \frac{1}{f_D T_c} \qquad \text{Eq. 12}$$

Figure 6:
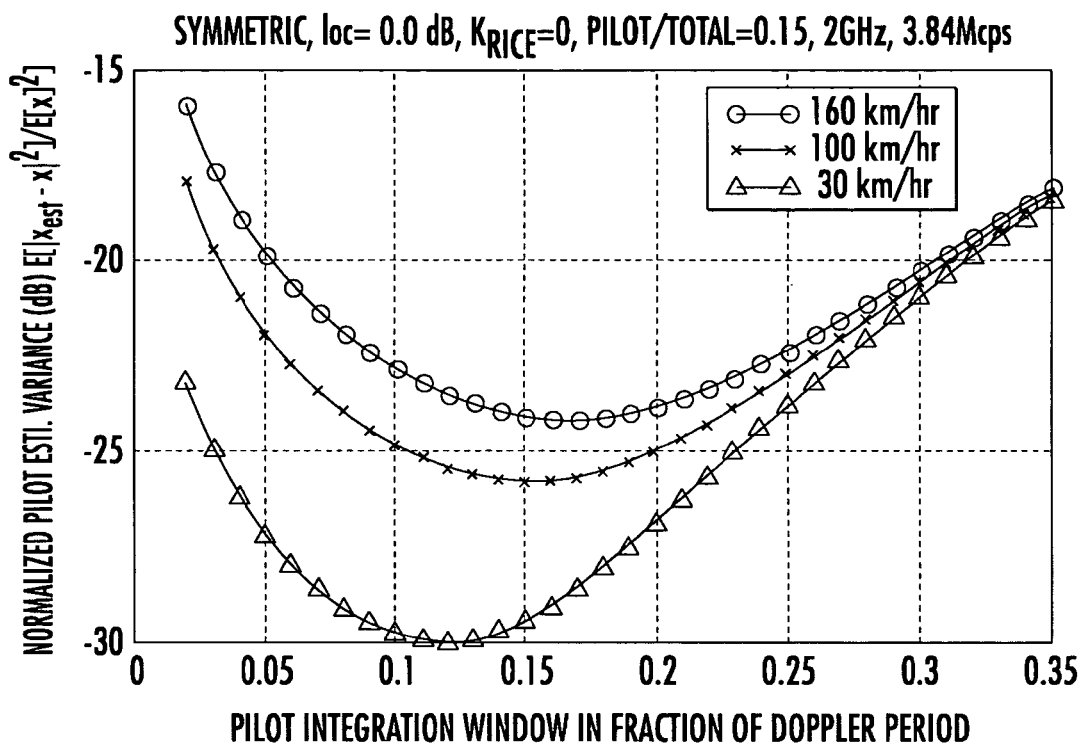
FIG. 6 is the performance of channel estimation error for symmetric pilot integration window; and, FIG. 7 is the performance of channel estimation error for asymmetric pilot integration window.
Figure 7:
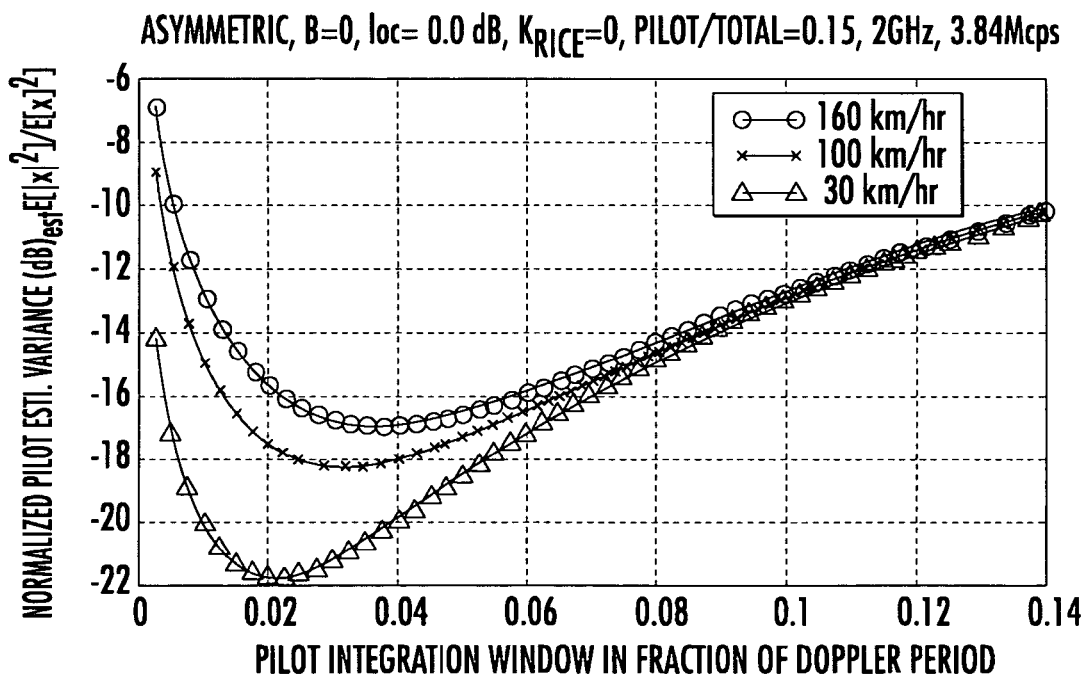

FIGS. 6 and 7 show the normalized channel estimation variance vs. the pilot integration period as a fraction of the Doppler period. The condition is using pilot power fraction equal to 15% at 2 GHz, 3.84 M chips per sec with symmetric and asymmetric window, respectively. Rayleigh fading and high other cell interference are used. Three different speeds are used in each case to test out the application range. From many scenarios, there is not a single optimal point for various conditions. However, in general, choosing a symmetric integration window of around 13% of the Doppler period yields close to optimal performance. If more aggressive rule can be used, one may want to optimize the integration period that is associated with the Doppler speed (i.e., the Vehicle speed), Rician parameter and interference level. One particular way that this can be done in a look up table.

Note that Doppler period changes inversely with the mobile speed. Therefore the proposed scheme here is actually an adaptive channel estimation that adjusts the integration window size based on the Doppler speed estimation.

The rough optimal asymmetric window size is around 3% of the Doppler period.

One immediate question for such an adaptive scheme is: what about multi-paths? For situations with multiple fingers in track, each finger should be separately estimating its Doppler frequency and then decide its pilot integration window. That is, the Doppler frequency estimation and thus the pilot integration window for finger 1 can be very different from that for finger 2. This is because each path (i.e., signal at different fingers) is composed by the signal reflected by different objects and therefore the Doppler frequency can be very different.

In implementation, the calculation for pilot integration window is actually straightforward once the Doppler frequency is available. For example, if a 200 Hz Doppler frequency is detected, then utilizing Equation 12, the Doppler period is then 3.84*10⁶/200=19200 (chips). So the pilot integration window for a symmetric window is then 0.13*19200=2496 chips while for an asymmetric window is then 0.03*19200=576 chips.

It should be noted that the present invention, method and apparatus to estimate the channel fade, is equally well suited for use with other wireless communication systems (not just CDMA). For example, TDMA systems also require channel estimate in the receiver operation. Similar technique can be easily applied to those systems.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications, which come within the scope of the appended claim, is reserved.

What is claimed is:

1. A digital radio system for obtaining a channel estimate of a plurality of path-dependent signals, wherein said signals include a pilot signal, the radio system comprising:
   a digital wireless rake receiver comprising a plurality of fingers, wherein said fingers are associated with said path-dependent signals, and wherein said fingers comprise:
      an integrator for integrating said pilot signal of said associated signal over a symmetric integration window of approximately 13% of a Doppler period of said pilot signal; and
      a channel estimator for obtaining the channel estimate of said associated signal based at least partially on said symmetric integration window.

2. The digital radio system as recited in claim 1, wherein said integration window is determined at least partially based on a Rician parameter.

3. The digital radio system as recited in claim 1 wherein said integration window is determined at least partially on an interference level.

4. A digital radio system for obtaining a channel estimate of a plurality of path-dependent signals, wherein said signals include a pilot signal, the radio system comprising:
   a digital wireless rake receiver comprising a plurality of fingers, wherein said fingers are associated with said path-dependent signals, and wherein said fingers comprise:
      an integrator for integrating said pilot signal of said associated signal over an asymmetric integration window of approximately 3% of a Doppler period of said pilot signal; and
      a channel estimator for obtaining the channel estimate of said associated signal based at least partially on said asymmetric integration window.

5. The digital radio system as recited in claim 4, wherein said integration window is determined at least partially based on a Rician parameter.

6. The digital radio system as recited in claim 2 wherein said integration window is determined at least partially on an interference level.

* * * * *